(12) United States Patent
Kruglick

(10) Patent No.: US 8,554,196 B2
(45) Date of Patent: Oct. 8, 2013

(54) NETWORK COVERAGE BY CYCLING THROUGH BEAM SHAPE COVERAGE CONFIGURATIONS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/321,792

(22) PCT Filed: Aug. 24, 2011

(86) PCT No.: PCT/US2011/049003
§ 371 (c)(1),
(2), (4) Date: Nov. 21, 2011

(87) PCT Pub. No.: WO2013/028187
PCT Pub. Date: Feb. 28, 2013

(65) Prior Publication Data
US 2013/0053018 A1    Feb. 28, 2013

(51) Int. Cl.
*H04W 16/24*    (2009.01)
(52) U.S. Cl.
USPC ................................. 455/422.1; 455/450

(58) Field of Classification Search
USPC ............................ 455/422.1, 427, 450, 562.1
See application file for complete search history.

(56) References Cited

U.S. PATENT DOCUMENTS

| | | | |
|---|---|---|---|
| 6,546,259 B1 * | 4/2003 | Vendryes | 455/513 |
| 2002/0137538 A1 | 9/2002 | Chen et al. | |
| 2006/0223573 A1 | 10/2006 | Jalali | |
| 2007/0142045 A1 | 6/2007 | Senarath et al. | |
| 2009/0296663 A1 | 12/2009 | Wild | |
| 2011/0223925 A1 * | 9/2011 | Gale et al. | 455/450 |

OTHER PUBLICATIONS

Australia Patent Office, International Search Report & Written Opinion of the International Searching Authority, prepared on Oct. 31, 2011 and mailed on Nov. 4, 2011, Australia.
Wortham, Jenna, Cellphones now used more for data than for calls, The New York Times, May 13, 2010, accessed on Nov. 21, 2011 via http://www.nytimes.com/2010/05/14/technology/personaltech/14talk.html.

* cited by examiner

*Primary Examiner* — Sam Bhattacharya
(74) *Attorney, Agent, or Firm* — Brundidge & Stanger, P.C.

(57) ABSTRACT

Technologies and implementations for providing network coverage by cycling through beam shape coverage configurations are generally disclosed.

27 Claims, 7 Drawing Sheets

500

Provide a First Coverage Configuration by Transmitting a Wide Beam of a More Capable Network to Provide Coverage for a First Group of Devices and Providing Coverage by a Less Capable Network to Interval Use Devices

510

Provide a Second Coverage Configuration by Transmitting a Wide Beam of a More Capable Network to Provide Coverage for a Second Group of Devices and Providing Coverage by a Less Capable Network to Interval Use Devices

520

Provide a Third Coverage by Transmitting a Narrow Beam of the More Capable Network to Provide Coverage for Continuous Use Devices and Providing Coverage by a Less Capable Network to Interval Use Devices

600 A computer program product

602 A signal bearing medium

604 Machine-readable instructions that, when executed, cause a computing device to:

cycle over time through a coverage sequence that includes providing a first coverage configuration and providing a second coverage configuration, wherein:

providing the first coverage configuration includes transmitting a first beam of a first network that is configured to provide coverage for the group of devices; and providing the second coverage configuration includes transmitting a second beam of the first network that is narrower than the first beam and configured to provide coverage to at least one continuous use device of the group of devices, and providing coverage by a second network to a plurality of interval use devices of the group of devices;

cycle over time through a coverage sequence that includes providing a first coverage configuration, providing a second coverage configuration, and providing a third coverage configuration, wherein:

providing the first coverage configuration includes transmitting a first beam of a first network that is configured to provide coverage for a first set of the group of devices, and providing coverage by a second network to at least a second set of the group of devices;

providing the second coverage configuration includes transmitting a second beam of the first network that is configured to provide coverage for the second set of the group of devices, and providing coverage by the second network to at least the first set of the group of devices; and providing the third coverage configuration includes transmitting a third beam of the first network that is narrower than the first beam and is configured to provide coverage to at least one continuous use device of the group of devices, and providing coverage by the second network to at least a plurality of interval use devices of the group; or cycle over time through an update sequence that includes:

deferring, during coverage by a first network, data updates for the device;

transmitting a data update request in response to coverage by a second network, wherein the second network is a more capable network than the first network; and receiving, during the second coverage configuration, a data update.

| 606 a computer-readable medium | 608 a recordable medium | 610 a communications medium |

Fig. 6

NETWORK COVERAGE BY CYCLING THROUGH BEAM SHAPE COVERAGE CONFIGURATIONS

BACKGROUND

Unless otherwise indicated herein, the approaches described in this section are not prior art to the claims in this application and are not admitted to be prior art by inclusion in this section.

In general, wireless communication networks may be becoming populated by devices that include both phone and data functionality. In some wireless communication networks, a wide beam configuration may provide coverage for all the devices in an area (or sector). Such a configuration may provide a relatively low power beam to both active and inactive devices.

SUMMARY

The present disclosure describes example methods for providing network coverage for a group of devices. Example methods may include cycling over time through a coverage sequence that includes providing a first coverage configuration and providing a second coverage configuration. Providing the first coverage configuration may include transmitting a first beam of a first network that may be configured to provide coverage for the group of devices. Providing the second coverage configuration may include transmitting a second beam of the first network that may be narrower than the first beam and configured to provide coverage to at least one continuous use device of the group of devices, and providing coverage by a second network to a plurality of interval use devices of the group of devices.

Other example methods may include cycling over time through a coverage sequence that includes providing a first coverage configuration, providing a second coverage configuration, and providing a third coverage configuration. Providing the first coverage configuration may include transmitting a first beam of a first network that may be configured to provide coverage for a first set of the group of devices, and providing coverage by a second network to at least a second set of the group of devices. Providing the second network coverage configuration may include transmitting a second beam of the first network that may be configured to provide coverage for the second set of the group of devices, and providing coverage by the second network to at least the first set of the group of devices. Providing the third coverage configuration may include transmitting a third beam of the first network that may be narrower than the first beam and configured to provide coverage to at least one continuous use device of the group of devices, and providing coverage by the second network to at least a plurality of interval use devices of the group.

The present disclosure also describes example machine readable non-transitory media having stored therein instructions that, when executed, cause a device to provide network coverage by cycling over time through a coverage sequence that includes providing a first coverage configuration and providing a second coverage configuration. Providing the first coverage configuration may include transmitting a first beam of a first network that may be configured to provide coverage for the group of devices. Providing the second coverage configuration may include transmitting a second beam of the first network that may be narrower than the first beam and configured to provide coverage to at least one continuous use device of the group of devices, and providing coverage by a second network to a plurality of interval use devices of the group of devices.

The present disclosure also describes example devices. Some example devices may include an adaptive antenna, a processor and a machine readable medium having stored therein instructions that, when executed by the processor, cause the device to provide network coverage by cycling over time through a coverage sequence that includes providing a first coverage configuration and providing a second coverage configuration. Providing the first coverage configuration may include transmitting a first beam of a first network that may be configured to provide coverage for the group of devices. Providing the second coverage configuration may include transmitting a second beam of the first network that may be narrower than the first beam and configured to provide coverage to at least one continuous use device of the group of devices, and providing coverage by a second network to a plurality of interval use devices of the group of devices.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 is an illustration of a flow chart of an example method for providing network coverage for a group of devices;

FIG. 6 is an illustration of an example computer program product; and

DETAILED DESCRIPTION

Figure 1A:
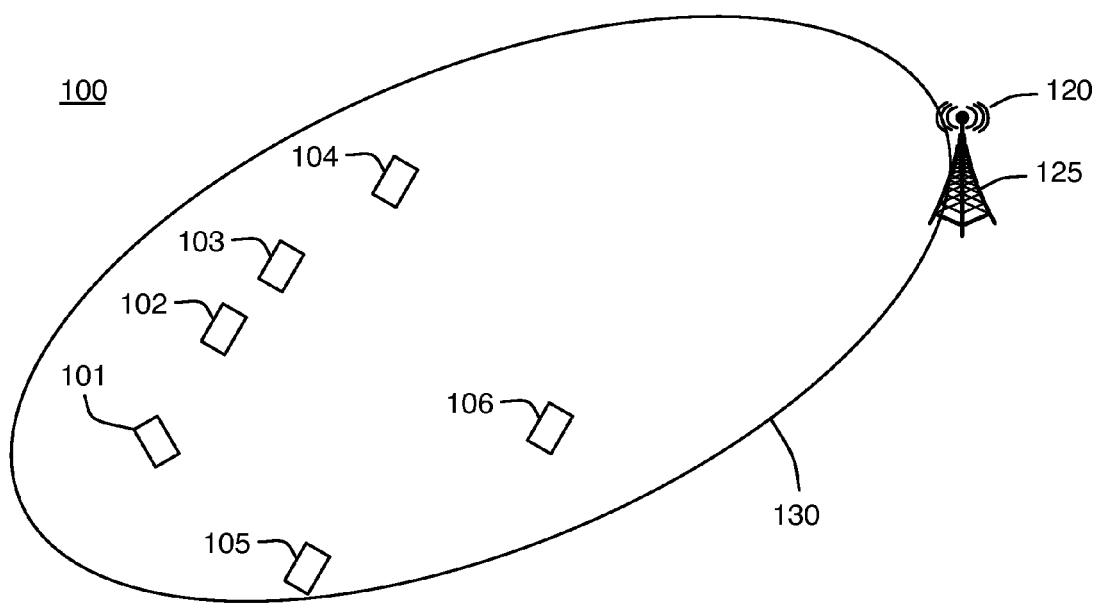
FIG. 1A is an illustration of a block diagram of an example network configuration.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing network coverage for a group of devices in an area.

In some embodiments, network coverage may be provided by cycling over time through a coverage sequence. In various examples, the coverage sequence may include two or more coverage configurations. For example, a first coverage configuration may include a beam that may be relatively wide such that it may provide coverage for all the devices in an area or sector. The beam may thereby provide coverage by a first type of network to all the devices. The second coverage configuration may include a beam that may be relatively narrow such that it may provide coverage by the first network type for one or more continuous use devices in the area. A continuous use device may include a device that may be actively involved in a substantially continuous service with the network. The substantially continuous service may generally include any type of substantially continuous service including, for example, a voice call, a download, a content streaming, or the like. The second coverage configuration may also include coverage by a second type of network to interval use devices in the area, which may include the devices that may be non-continuous use devices. In general, the first type of network may be a more capable network than the second type of network. As mentioned, the network coverage may be provided by cycling over time through the coverage sequence and, in the discussed example, cycling over time through the coverage sequence may include alternating between the first and second coverage configurations.

Such an embodiment may have several advantages. For example, for the continuous use device or devices, the narrower beam may provide greater signal power to the device during the second coverage configuration since a narrow beam has substantially more power than a wide beam. By providing more power in the carrier signal to a continuous use device, the device may have increased bandwidth and may operate with significantly less power since the device's receiver amplifier power may be backed down to a lower level. Also, since the focus may be substantially symmetrical, the device may further operate with less power as the device transmitter may be backed down to a lower level. For the interval use devices, network coverage may be provided at all times (as is needed in case the device may need to become a continuous use device at receiving or making a call or initiating a download or the like). Further, some or all of the interval use devices may have applications that require intermittent updating such as, for example, social networking applications, email, Really Simple Syndication (RSS) feeds, map updates, game update, sports score update, or the like. As discussed, during the second coverage configuration, the interval use devices may be on a less capable network. At the interval use devices, requests by applications requiring intermittent updates may be postponed and/or batched and not sent during coverage by the less capable network. Then, during the first coverage configuration when covered by the more capable network, the interval use devices requiring intermittent updates may request and/or receive data downloads related to those applications.

Therefore, the examples discussed herein may provide narrow beam coverage by a more capable network to continuous use devices and coverage by a less capable network to interval use devices during a coverage configuration. After a time in such a configuration, the coverage may alternate to another coverage configuration that provides coverage for continuous use and interval use devices by a wide beam of the more capable network. The continuous use devices may remain on the more capable network, alternating between relatively higher power coverage by a narrow beam and relatively lower power coverage by a wide beam. The interval use devices may alternate between coverage by the less capable network (which may provide some useful services such as text messaging, for example, and which may detect a service initiation that makes the device a continuous use device) and coverage by a wide beam of the more capable network (which may provide opportunity for updates and data download for intermittent applications).

Figure 1B:
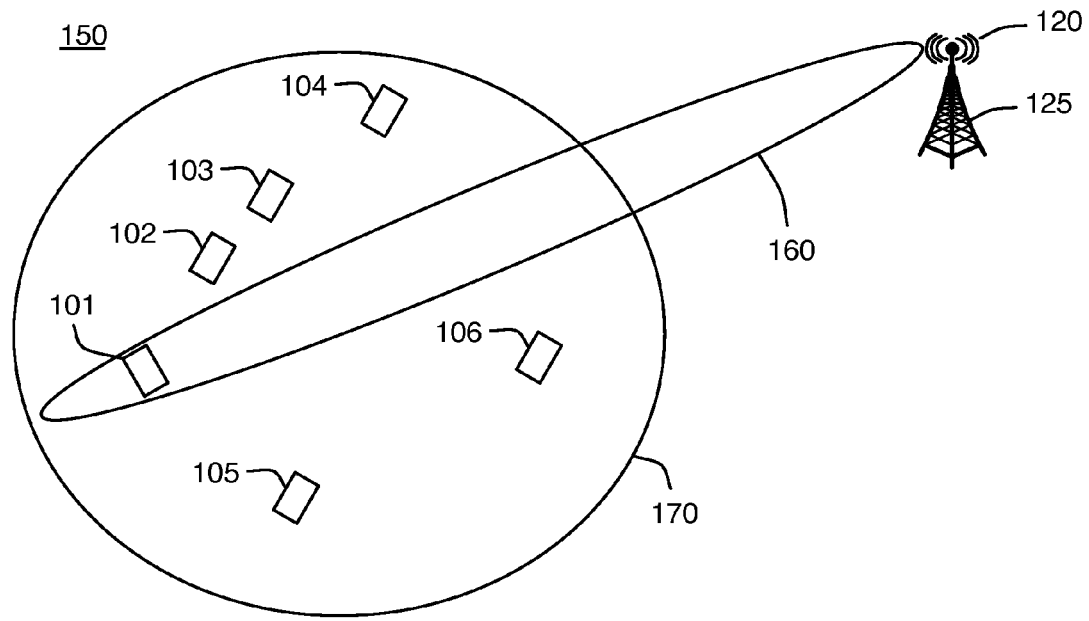
FIG. 1B is an illustration of a block diagram of an example network configuration.

FIGS. 1A and 1B are illustrations of block diagrams of an example network coverage 100 and an example network coverage 150, respectively, arranged in accordance with at least some embodiments of the present disclosure. As shown in FIG. 1A, network coverage 100 may include a beam shape 130 transmitted by an antenna 120 that may be mounted on a tower 125. Beam shape 130 may provide network coverage for continuous use device 101 and interval use devices 102, 103, 104, 105, 106. In some examples, beam shape 130 may provide wide beam coverage of a first network type to all the devices in an area.

As shown in FIG. 1B, network coverage 150 may include a beam shape 160 provided by antenna 120 that may provide network coverage for continuous use device 101, and a network coverage 170 may be provided to interval use devices 102, 103, 104, 105, 106. In some examples, beam shape 160 may provide narrow beam coverage of the first network type to continuous use device 101 and network coverage 170 may be of a second network type and may be provided to interval use devices 102, 103, 104, 105, 106. In some examples, network coverage 170 may be provided by an overlapping network that may overlap the network coverage that may be provided by beam shape 160. In general, interval use devices may include all the devices in the area that are not continuous use devices. In some examples, interval use devices may have applications that require intermittent updates. In some examples, interval use devices may not include such applications. In some examples, beam shape 160 may provide no coverage to interval use devices 102, 103, 104, 105, 106.

In general, antenna 120 may include any suitable antenna that may provide beam shape 130 and beam shape 160. In some examples, antenna 120 may include an adaptive antenna having active beamforming capability. In general, beamforming may include directional signal transmission. In some examples, antenna 120 may be controlled by a controlling device such as a controller, a computer, a device discussed below with respect to FIG. 7, or the like, that may provide adaptive beam shape parameters to antenna 120 that may define the formed beam shape. In some examples, the control for providing the beam shape parameters may be provided in software at the controlling device, in firmware at the controlling device, or in hardware at the controlling device. In some examples, the control may be provided in beam management software at the controlling device.

In some examples, the first network type may be a more capable network than the second network type, as is further discussed below. In various examples, network coverage 170 may be provided by antenna 120, a different antenna at tower 125, or a different antenna mounted at a different tower. In some examples, network coverage 170 may provide coverage for only interval use devices. In some examples, network coverage 170 may provide coverage for all devices including continuous use devices and interval use devices.

As shown, in an area one or more devices may be continuous use devices and one or more devices may be interval use devices. In general, a continuous use device may include a device that may be engaged in a substantially continuous service such as, for example, a voice call, a download, a content streaming, or the like. An interval use device may include a device that may not be currently engaged in a substantially continuous service. As will be appreciated, the interval use devices may still require network coverage since they may make or receive calls, begin a continuous service, make or receive text messages, or the like. As shown, in some examples, only one continuous use device may be in an area. In general, there may be any number of continuous use devices and the devices may change state between continuous use and interval use based on user action or the device receiving an initiation of a continuous service.

As is discussed herein, network coverage may be provided for devices in an area by cycling over time through a coverage sequence that includes network coverage 100 and network coverage 150. Such a cycling method may provide numerous advantages over a substantially static coverage method. In some examples, devices may vary the receiver amplifier power based on the power of a received signal such that the power may be backed off until the signal may be barely receivable by the device. Such methods may allow for the device to use a relatively low amount of power to receive the signal. As will be appreciated, a wide signal sent by antenna 120 will have less power than a narrow signal. In some examples, the power of the transmitted signal may be inversely proportional to the angle (width) of the signal. For example, a signal sent over 2 degrees may be 6 times more powerful than a signal sent over 12 degrees.

For continuous use device 101, cycling between network coverage 100 and network coverage 150 may offer the advantages of high bandwidth, lower power usage and/or increased battery life. In some examples, during network coverage 150, continuous use device 101 may receive a higher bandwidth or more reliable signal when covered by beam shape 160. In some examples, during network coverage 150, the power of beam shape 160 may allow continuous use device 110 to use substantially less power in receiving the signal from antenna 120. In some examples, network coverage 150 may be maintained for a longer duration than network coverage 100 such that the advantage for continuous use device 101 may be substantial. For example, if the power demand to send and receive during beam shape 160 may be A, the power demand to send and receive during beam shape 130 may be B, and the proportion of time spent in beam shape 160 may be p, the power demand D at device 101, may be:

$$D = pA + (1-p)B \qquad (1)$$

Equation (1) may trend to A as p increases. In an example, a cycle may take 5 minutes and may be in beam shape 160 for 292 seconds and in beam shape 130 for 8 seconds such that p may be 97.3%, and A may be 20% of B. In such an example, the power demanded by a device using the cyclic method described between beam shapes 130, 160 may reduce the overall power by a factor of 4.86 as compared to a device covered continually by beam shape 130. Such savings in power usage may substantially extend the battery life of devices.

In some examples, the direction of transmission beam shape 160 may be based on the location of continuous use device 101. In general, a device may be characterized as a continuous use device using any suitable technique or techniques. In some examples, a device may be characterized as continuous use by characterizing traffic coming through a base station that may service antenna 120. In some examples, the traffic for each device in an area may be compared to determine which devices (if any) may be continuous use devices. In some examples, the largest and most persistent traffic may characterize a continuous use device. In some examples, the device may provide an indication characterizing the device such as a continuous use indication, an interval use indication, or the like. The location of continuous use device 101 may be determined using any suitable technique such as, for example, global positioning methods, triangulation methods, device tracking methods, or the like. As discussed herein, in some examples, more than one device may be in continuous use. In some examples, beam shape 160 may be provided such that it may encompass all the continuous use devices. In some examples, beam shape 160 may include multiple directed narrow beams that either service single continuous use devices or groups of continuous use devices.

For interval use devices 102, 103, 104, 105, 106, cycling between network coverage 100 and network coverage 150 may not negatively impact service. In general, interval use devices may require a variety of services that may be postponed and/or batched such that the service may be performed when the device may be covered by the more capable network and the service may be postponed while the device may be covered by the less capable network. For example, an interval use device may not receive data updates to intermittent applications during network coverage 150. During network coverage 150, the interval use device may identify that it may be covered by a less capable network and it may not make requests for data for interval services.

In general, any service that may not require continuous service to the device may be classified and managed as an interval use device. In some examples, the interval services may include social networking applications, email, Really Simple Syndication (RSS) feeds, map updates, game update, sports score update, or the like. In such examples, the interval use device may be able to wait for data updates, feeds, or the like. During network coverage 100, the interval use devices may be covered by a more capable network and may request and download the data that had been postponed and/or batched during network coverage 150. As discussed herein, in some examples, network coverage 100 may be maintained for a shorter duration than network coverage 150 such that a continuous use device or devices may have the advantage of using substantially less power. In such examples, short durations of network coverage 100 may provide the opportunity for interval use devices to receive substantially all or most of their requested downloads since those requests may be relatively small or minor for the more capable network.

As shown in FIGS. 1A and 1B, in some examples, beam shape 160 may be narrower than beam shape 130. In some examples, beam shape 160 may be narrower than beam shape 130 in a substantially horizontal orientation. In some examples, beam shape 160 may be narrower than beam shape 130 in a substantially vertical orientation. In some examples, beam shape 160 may be narrower than beam shape 130 in both a substantially horizontal orientation and a substantially vertical orientation. As discussed herein, a narrower beam may provide more power in proportion to the inverse of the width of the beam. For a beam that may be narrower in two directions (horizontal and vertical, for example) a narrower beam may provide more power in proportion to the inverse of the width of the beam in the horizontal direction and in proportion to the inverse of the width of the beam in the vertical direction. In general, the width (or angle) of beam shape 130 may include any suitable width. In some examples, the width of beam shape 130 may be in the range of about 90 degrees to 180 degrees. In some examples, the width of beam shape 130 may be in the range of about 30 degrees to 90 degrees. In some examples, the width of beam shape 130 may be in the range of about 10 degrees to 30 degrees.

In general, the width (or angle) of beam shape 160 may be any suitable width such that it may be narrower than beam shape 130. In some examples, the width of beam shape 160 may be in the range of about 1 degree to 3 degrees. In some examples, the width of beam shape 160 may be in the range of about 3 degree to 10 degrees. In some examples, the width of beam shape 160 may be in the range of about 10 degree to 20 degrees. As discussed herein, in various examples, the number of continuous use devices may vary and the width of beam shape 160 may vary to cover a single continuous use device or multiple continuous use devices. In such examples, the width of beam shape 160 may be based in part on the locations of the continuous use devices such that a narrower shape may be used when they may be closely clustered while a wider shape may be used when they may be more disparately clustered. Also as discussed herein, in some examples, multiple continuous use devices may be covered by multiple narrow beam shapes. In such examples, the multiple beams may each cover one or more continuous use devices and, similarly, the width of the narrow beam shape may depend on the number and/or clustering of the continuous use device or devices.

In some examples, multiple areas or sectors may be serviced by tower 125 and/or antenna 120. For example, the 360 degrees around antenna 120 may be divided into areas or sectors such as, for example, 10 to 30 sectors. In such examples, each area or sector may be covered by a beam shape analogous to beam shape 130 during one coverage configuration and the area or sector may be covered by a configuration including a narrow beam servicing continuous use devices and coverage by a less capable network for interval use devices. In general, each area or sector may employ the cyclic beam adaptation methods discussed herein. In some examples, the beam cycles for each sector may have substantially matching phases. In some examples, the beam cycles for each sector may be out of phase. In such sector based examples, a variety of adaptive configurations for covering the areas may be provided including narrow beams covering for different areas of sectors when those areas have a large number or disparate clustering of continuous use devices, or the like.

Figure 2:
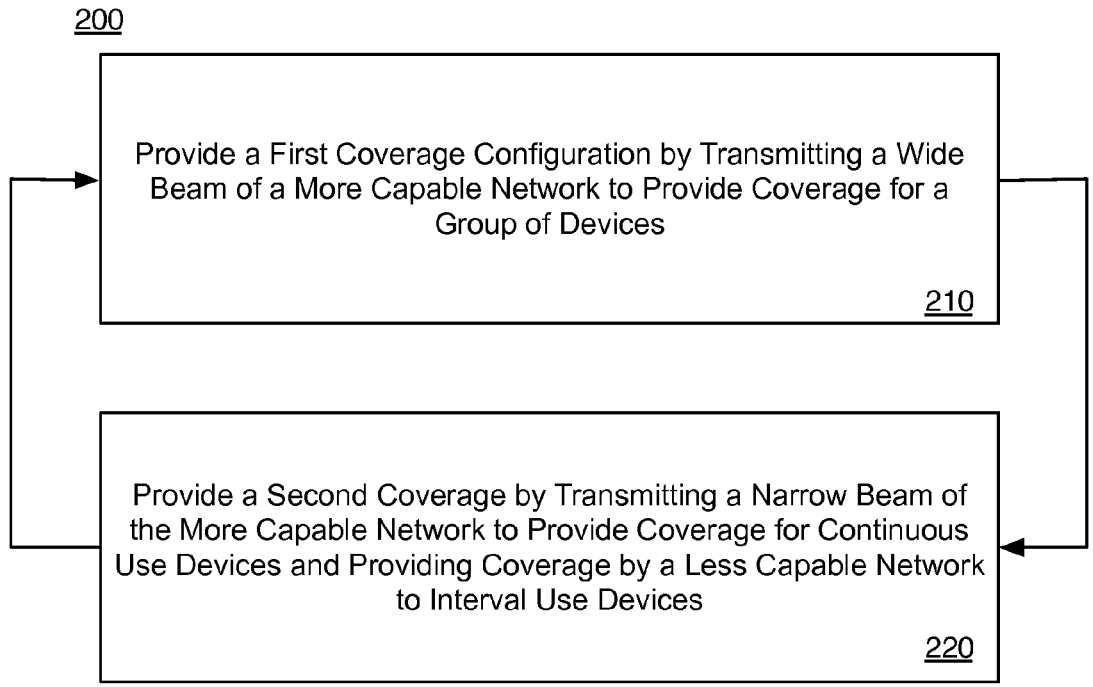
FIG. 2 is an illustration of a flow chart of an example method for providing network coverage for a group of devices.

FIG. 2 is an illustration of a flow chart of an example method 200 for providing network coverage for a group of devices in an area, arranged in accordance with at least some embodiments of the present disclosure. Method 200, and other methods and techniques described herein set forth various functional blocks or actions that may be described as processing steps, functional operations, events and/or acts, etc., which may be performed by hardware, software, and/or firmware. Numerous alternatives to the functional blocks shown in FIG. 2 may be practiced in various implementations. For example, intervening actions not shown in FIG. 2 and/or additional actions not shown in FIG. 2 may be employed and/or some of the actions shown in FIG. 2 may be eliminated, without departing from the scope of claimed subject matter. Method 200 may include one or more of functional operations as indicated by one or more of blocks 210 and/or 220.

As shown in FIG. 2, the process of method 200 may cycle over time through a coverage sequence that includes providing a first coverage configuration and providing a second coverage configuration. At block 210, "Provide a First Coverage Configuration by Transmitting a Wide Beam of a More Capable Network to Provide Coverage for a Group of Devices", a first coverage configuration as described may be provided. The process may continue at block 220. At block 220, "Provide a Second Coverage by Transmitting a Narrow Beam of the More Capable Network to Provide Coverage for Continuous Use Devices and Providing Coverage by a Less Capable Network to Interval Use Devices", a second coverage configuration as described may be provided. As shown, the coverage sequence may continue at block 210 and may continue to cycle over time between the first and second coverage configurations.

In some examples, the first coverage configuration may be network coverage 100 as shown in FIG. 1A and the second coverage configuration may be network coverage 150 as shown in FIG. 1B. As discussed, a coverage configuration having a wide beam of a more capable network type and a coverage configuration having a narrow beam servicing a continuous device or devices and a less capable network covering interval use devices may be cycled through over time. In general, the coverage configurations each may be maintained for any suitable durations of time. In some examples, a first configuration having the wide beam of the more capable network configuration may be provided for a duration that may be shorter than the duration of a second configuration having a narrow beam servicing a continuous device or devices and a less capable network covering interval use devices.

In general, the first configuration and the second configuration may be provided for any suitable durations. In some examples, the first configuration may be provided for a duration in the range of about 2 to 10 seconds. In some examples, the first configuration may be provided for a duration in the range of about 1 to 5 seconds. In some examples, the first configuration may be provided for a duration in the range of about 7 to 15 seconds. In some examples, the second configuration may be provided for a duration in the range of about 2 to 5 minutes. In some examples, the second configuration may be provided for a duration in the range of about 1 to 3 minutes. In some examples, the second configuration may be provided for a duration in the range of about 4 to 8 minutes.

In some examples, the configurations may be cycled over time using the same durations such that the durations remain substantially constant. In some examples, the configurations may be cycled using durations that vary over time. The cycle durations may be varied based on factors such as, for example, the number of devices in the area, the number of continuous use devices, the number of interval use devices, the ratio of continuous use devices to interval use devices, the type of devices, the type or amount of data requested by the interval devices, or the like.

As discussed, in some examples, a more capable and a less capable network may be provided. In general, a more capable network may provide greater uplink and/or downlink rates, may be more stable, may be of a more advanced standard, or the like. In general, any combination of network types may be provided. In some examples, the more capable network may be a Worldwide Interoperability for Microwave Access (WiMAX) network. In some examples, the more capable network may be a Third Generation Mobile (3G) network and the less capable network may be an Enhanced Data Rates for Global Evolution (EDGE) network. In some examples, the more capable network may be a Fourth Generation Mobile (4G) network and the less capable network may be an Enhanced Data Rates for Global Evolution (EDGE) network. In some examples, the more capable network may be a Long Term Evolution (LTE) network and the less capable network may be an Enhanced Data Rates for Global Evolution (EDGE) network. In some examples, the less capable network may be a Third Generation Mobile (3G) network. In some examples, the less capable network may be a Third Generation Mobile (3G) network and the more capable network may be a Worldwide Interoperability for Microwave Access (WiMAX) network. In some examples, the less capable network may be a Third Generation Mobile (3G) network and the more capable network may be a Fourth Generation Mobile (4G) network. In some examples, the more capable network may be an Evolution-Data Optimized (EV-DO) network and the less capable network may be a Code Division Multiple Access (CDMA) network. In some examples, the more capable network may be a data network and the less capable network may be a voice network. In some examples, the more capable network may be a data network and the less capable network may be a mixed voice and data network. In some examples, the networks may be of the same type. In such examples, the continuous use device or devices may be allowed access to the more capable network based on an admission control parameter such that admission may be provided only to continuous use devices.

As discussed, as method 200 continues, various devices may change state from continuous use to interval use or from interval use to continuous use. In some examples, a subsequent iteration of providing the coverage configuration of block 220 may include transmitting the narrow beam of the more capable network to provide coverage to a continuous use device that may have previously been an interval use device. In some examples, no devices may currently be continuous use devices. In such examples, the method may maintain the network coverage of block 210 such that all devices may be covered by the more capable network. In such examples, the devices may receive more frequent updates to the intermittent data applications and data requests may not be postponed and/or batched. In general, such configuration adaptations may be implemented by any suitable controller or computing device as discussed herein.

The beam shapes discussed herein may be provided by any suitable antenna, antenna array, adaptive antenna, or the like. The antenna or antennas may be controlled using any suitable techniques. As discussed herein, in some examples, multiple networks may be provided during various coverage configurations. The multiple networks may be provided using any suitable antenna and/or tower configuration. The networks may be controlled using any suitable techniques. In some examples, the less capable network may be a substantially static network that may not require control techniques (beyond those already implemented by the network) to be used in the various configurations discussed herein.

Figure 3:
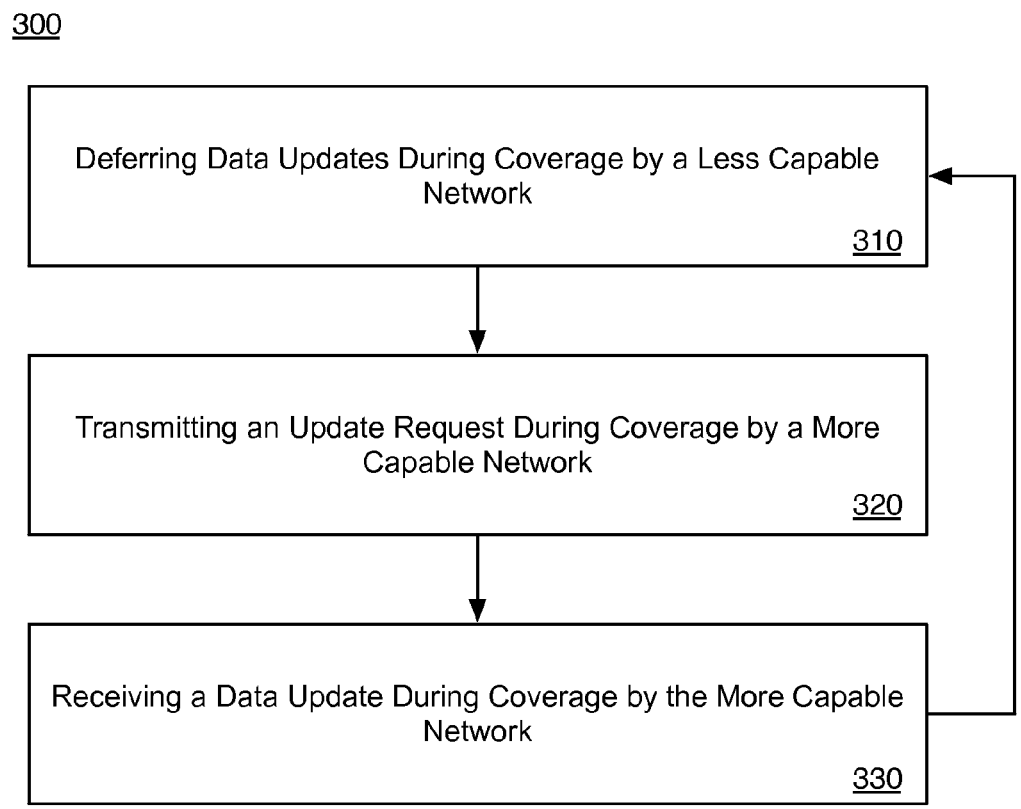
FIG. 3 is an illustration of a flow chart of an example method for a device to receive data updates.

FIG. 3 is an illustration of a flow chart of an example method 300 for an interval use device to receive data updates, arranged in accordance with at least some embodiments of the present disclosure. Method 300 may be performed by hardware, software, and/or firmware of any suitable device discussed herein. In some examples, intervening actions not shown in FIG. 3 and/or additional actions not shown in FIG. 3 may be employed, without departing from the scope of claimed subject matter. Method 300 may include one or more of functional operations as indicated by one or more of blocks 310, 320, 330. Method 300 may be performed in any of the network coverage sequences discussed herein such as those discussed with respect to FIGS. 1A, 1B and 2 or those discussed with respect to FIGS. 4A, 4B, 4C and 5. The process of method 300 may begin at block 310.

At block 310, "Deferring Data Updates During Coverage by a Less Capable Network", an interval use device may defer data updates for intermittent use applications while covered by a less capable network. As discussed, in some examples, an intermittent use application may include any application that does not require continuous service or immediate access to data such as, for example, social networking applications, email, Really Simple Syndication (RSS) feeds, map updates, game update, sports score update, or the like. The interval use device may be any suitable device, such as, for example, a mobile phone, a smartphone, a laptop computer, a netbook device, a tablet device, a personal digital assistant, a machine-to-machine (M2M) data system, or the like.

In some examples, during coverage by a less capable network, an intermittent use application or the operating system of an interval use device may not allow update requests when the device may be covered by a less capable network. In such examples, the device may identify the type of network it may be covered by and the device may set a no updates flag or the like when coverage by a network below a threshold quality may be determined. The less capable network may be any suitable type including any of those discussed herein. In some examples, during the coverage by a less capable network, an interval use device may be in a sleep mode. In such examples, the device may set a flag such that no updates may be made while the device may be in a sleep mode or until a command may be made by a user input. Upon being awoken by the user, for example, the device may determine the type of network it may be covered by and determine whether an update request may be made as discussed above.

In some examples, the operating system of an interval use device may gather update request from a number of intermittent use applications and batch them as one or more update requests. In some examples, an intermittent use application or the operating system of an interval use device may allow data update requests only when the device may be in an awake state. In some examples, deferring and/or batching data update requests may be in line with best practices of intermittent application developers such that an implementation of the methods discussed herein may not negatively impact the functionality of applications for device users. The process of method 300 may continue at block 320.

At block 320, "Transmitting an Update Request During Coverage by a More Capable Network", the interval use device may detect coverage by a more capable network and may transmit an update request. In general, the update request may be any suitable transmission that communicates an update request across the network and to a server, for example. In some examples, the update request may include an update request for a single application. In some examples, the update request may include a batched request that may include update requests for multiple applications. The process of method 300 may continue at block 330.

At block 330, "Receiving a Data Update During Coverage by the More Capable Network", the interval use device may receive a data update over the network in response to the transmitted data update request. In general, the data update may be received using any suitable technique or techniques. In some examples, the data update may be for a single application. In some examples, the data update may be for multiple applications. In some examples, more than one data request may be received at the interval use device. Although not shown in FIG. 3 for the sake of clarity, while covered by the more capable network, the interval use device may send one or more additional data update requests subsequent to receiving the data update at block 330. As shown, the process of method 300 may continue at block 310 and may cycle through blocks 310, 320, 330 as the network configurations may be cycled as discussed herein.

In some examples, the effect of cycling over time through the discussed coverage configurations may have the effect of pushing interval use devices including smart devices into synchronized updating patterns such that they defer updates during coverage by a less capable network and request update when covered by a wide beam of a more capable network.

Figure 4A:
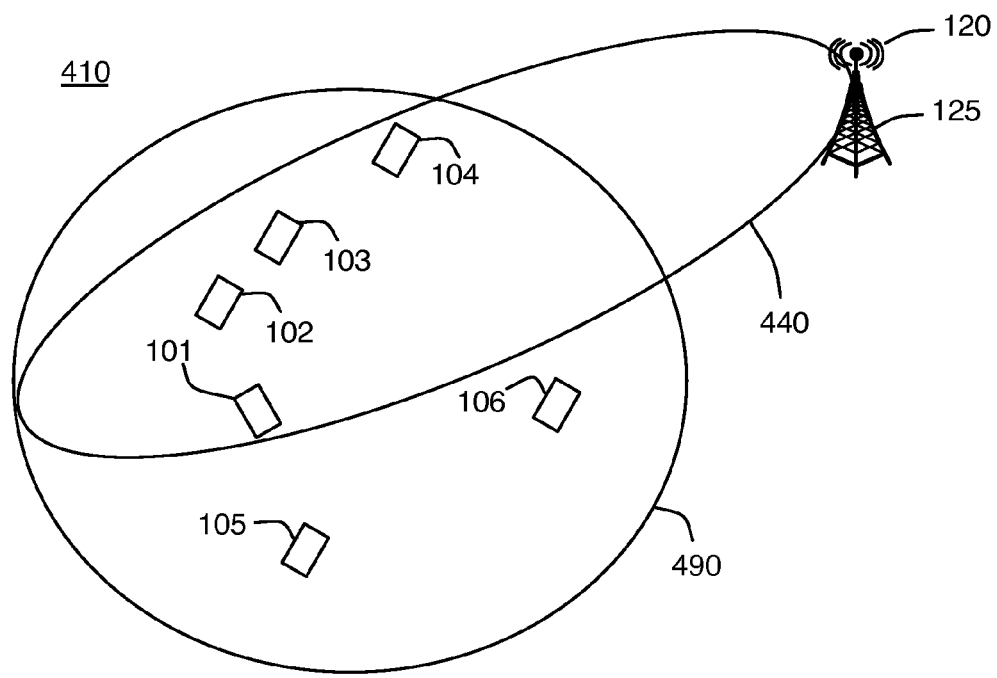
FIG. 4A is an illustration of a block diagram of an example network configuration.
Figure 4B:
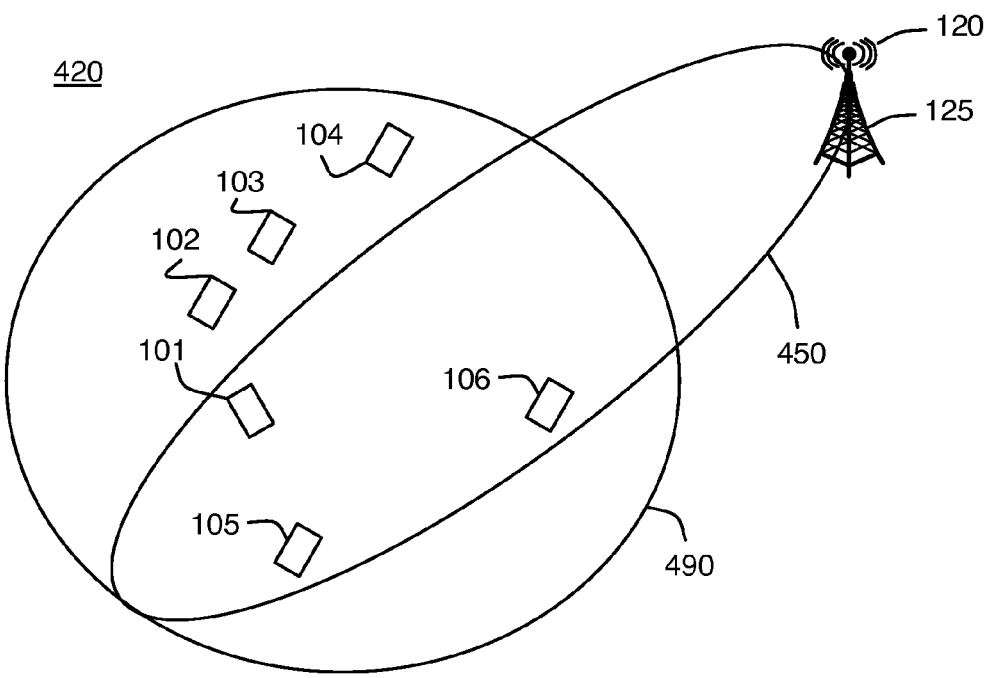
FIG. 4B is an illustration of a block diagram of an example network configuration.
Figure 4C:
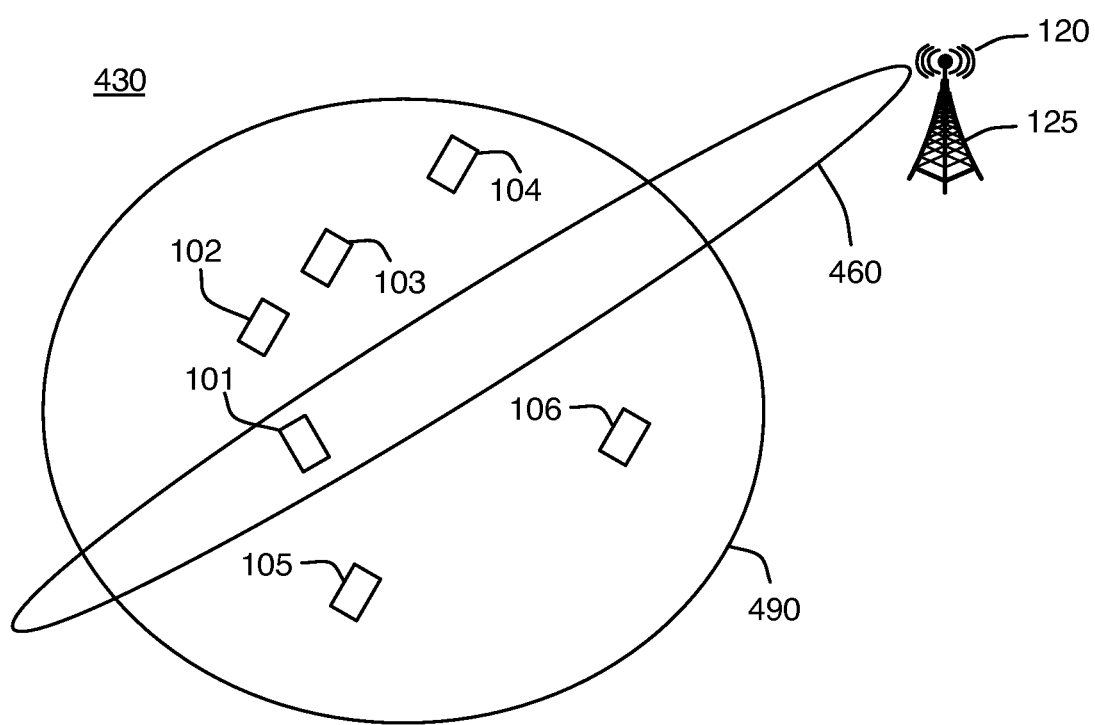
FIG. 4C is an illustration of a block diagram of an example network configuration.

FIGS. 4A, 4B and 4C are illustrations of block diagrams of an example network coverage 410, an example network coverage 420 and an example network coverage 430, respectively. As shown in FIG. 4A, network coverage 410 may include a beam shape 440 transmitted by antenna 120 mounted on tower 125 that may provide network coverage for continuous use devices 101 and interval use devices 102, 103, 104, and a network coverage 490 that may be provided to interval use devices 105, 106. In some examples, beam shape 440 may provide relatively wide beam coverage of a first network type to a group of devices in an area and network coverage 490 may be of a second network type. In some examples, continuous use device 101 and interval use devices 102, 103, 104 may be a first group or population of all the devices in an area. In some examples, the first network type may be of a more capable network and the second network may be of a less capable network type as discussed herein.

As shown in FIG. 4B, network coverage 420 may include a beam shape 450 provided by antenna 120 that may provide network coverage for continuous use device 101 and interval use devices 105, 106, and network coverage 490 that may be provided to interval use devices 102, 103, 104. In some examples, beam shape 450 may provide relatively wide beam coverage of the first network type a group of devices in an area. In some examples, devices 105, 106 may be a second group or population of all the devices in an area. As shown in FIGS. 4A and 4B, in some examples, beam shape 440 may provide network coverage to a first group of devices in an area and beam shape 450 may provide network coverage to a second group of devices in the area such that the first group and the second group make up all the devices in the area. In some examples, a continuous use device or devices may be included in both beam shapes such that the continuous use device or devices may be continually covered by the first network type. As illustrated, in some examples, beam shape 440 and beam shape 450 may be substantially the same width (or angle). In other examples, beam shape 440 and beam shape 450 may be different.

As shown in FIG. 4C, network coverage 430 may include a beam shape 460 provided by antenna 120 that may provide network coverage for continuous use device 101, and network coverage 490 that may be provided to interval use devices 102, 103, 104, 105, 106. In some examples, beam shape 460 may provide narrow beam coverage of the first network type to continuous use device 101 and network coverage 490 may provide coverage of a second network type to interval use devices 102, 103, 104, 105, 106. In some examples, network coverage 490 may be provided by an overlapping network that may overlap the network coverage that may be provided by beam shapes 440, 450, 460. In general, the continuous use devices and interval use devices may include any of the devices, applications, or characteristics as discussed herein. As discussed, the network type of beam shapes 440, 450, 460 may be of a more capable network and network coverage 490 may be of a less capable network type as discussed herein. The more capable network and the less capable network may be of any suitable network types, including any of those discussed herein.

In various examples, antenna 120, tower 125 and any controlling device coupled to antenna may include any of the characteristics and types as those discussed herein. As discussed herein, in some examples, multiple areas or sectors may be covered by tower 120 and/or antenna. In such examples, one or more of the sectors may be covered by network coverage configurations like network coverages 410, 420, 430. Also, beam shapes 440, 450, 460 may include any of those discussed herein and, in particular, with respect to FIGS. 1A and 1B above. In general, the width of the beam shapes 440, 450 may include any suitable widths. In some examples, the width of beam shapes 440, 450 may be in the range of about 45 degrees to 90 degrees. In some examples, the width of beam shapes 440, 450 may be in the range of about 15 degrees to 45 degrees. In some examples, the width of beam shapes 440, 450 may be in the range of about 5 degrees to 15 degrees. As discussed, in some examples, beam shapes 440, 450 may be the same width while in other examples they may be different. In some examples, beam shapes 440, 450 may be structured such that each covers the continuous use devices in the area.

In general, beam shape 460 may be any suitable width such that it may be narrower than one of beam shape 440 or beam shape 450. In some examples, the width of beam shape 460 may be in the range of about 1 degree to 3 degrees. In some examples, the width of beam shape 460 may be in the range of about 3 degree to 10 degrees. In some examples, the width of beam shape 460 may be in the range of about 10 degree to 20 degrees. As discussed herein, in various examples, the number of continuous use devices may vary and the width of beam shape 460 may vary to cover a single continuous use device or multiple continuous use devices. In such examples, the width of beam shape 460 may be based in part on the locations of the continuous use devices such that a narrower shape may be used when they may be closely clustered while a wider shape may be used when they may be more disparately clustered. Also as discussed herein, in some examples, multiple continuous use devices may be covered by multiple narrow beam shapes. In such examples, the multiple beams may each cover one or more continuous use devices and, similarly, the width of the narrow beam shape may depend on the number and/or clustering of the continuous use device or devices.

FIG. 5 is an illustration of a flow chart of an example method 500 for providing network coverage for a group of devices in an area, arranged in accordance with at least some embodiments of the present disclosure. Method 500 sets forth various functional blocks or actions that may be described as processing steps, functional operations, events and/or acts, etc., which may be performed by hardware, software, and/or firmware. In some examples, intervening actions not shown in FIG. 5 may be employed without departing from the scope of claimed subject matter. Method 500 may include one or more of functional operations as indicated by one or more of blocks 510, 520 and/or 530. As shown in FIG. 5, the process of method 500 may cycle over time through a coverage sequence that includes providing a first, second and third coverage configurations. The process of method 500 may begin at block 510.

At block 510, "Provide a First Coverage Configuration by Transmitting a Wide Beam of a More Capable Network to Provide Coverage for a First Group of Devices and Providing Coverage by a Less Capable Network to Interval Use Devices", a first configuration as described may be provided. In some examples, the first configuration may be network coverage 410 as illustrated in FIG. 4A. The process of method 500 may continue at block 520.

At block 520, "Provide a Second Coverage Configuration by Transmitting a Wide Beam of a More Capable Network to Provide Coverage for a Second Group of Devices and Providing Coverage by a Less Capable Network to Interval Use Devices", a second configuration as described may be provided. In some examples, the second configuration may be network coverage 420 as illustrated in FIG. 4B. The process of method 500 may continue at block 530.

At block 530, "Provide a Third Coverage by Transmitting a Narrow Beam of the More Capable Network to Provide Coverage for Continuous Use Devices and Providing Coverage by a Less Capable Network to Interval Use Devices", a third configuration as described may be provided. In some examples, the third configuration may be network coverage 430 as illustrated in FIG. 4C. As illustrated in FIG. 5, the process of method 500 may continue by cycling back to block 510, and the process may continue to cycle through blocks 510, 520 and 530 through time.

As discussed, network coverages 410, 420, 430 may be cycled through over time. In general, the coverage configurations each may be maintained for any suitable durations of time. In some examples, network coverage 410 and network coverage 420 may be provided for a duration that may be shorter than the duration of network coverage 430. In some examples, network coverages 410, 420 may be provided for a duration in the range of about 2 to 10 seconds. In some examples, network coverages 410, 420 may be provided for a duration in the range of about 1 to 5 seconds. In some examples, network coverages 410, 420 may be provided for a duration in the range of about 7 to 15 seconds. In some examples, network coverage 430 may be provided for a duration in the range of about 2 to 5 minutes. In some examples, network coverage 430 may be provided for a duration in the range of about 1 to 3 minutes. In some examples, network coverage 430 may be provided for a duration in the range of about 4 to 8 minutes.

In some examples, the configurations may be cycled over time using the same durations such that the durations remain substantially constant. In some examples, the configurations may be cycled using durations that vary over time. The cycle durations may be varied based on factors such as, for example, the number of devices in the area, the number of continuous use devices, the number of interval use devices, the ratio of continuous use devices to interval use devices, or the like.

As discussed, in some examples, network coverages 410, 420, 430 may be cycled through over time. In some examples, network coverages 410, 420 may be cycled through over time (without use of network coverage 430). Such examples may provide for the power savings discussed herein and may provide simplicity of implementation. Such examples may provide beam shape 440 and beam shape 450 having overlapping coverage areas for continuous use users, such as, for example, continuous use user 101. Such examples may include cycling over time through a coverage sequence that may include a first coverage configuration and a second coverage configuration. Providing the first coverage configuration may include transmitting a beam of a more capable network to provide coverage to a first group of devices and providing coverage of a less capable network to interval use devices. Providing the second coverage configuration may include transmitting a beam of a more capable network to provide coverage to a second group of devices and providing coverage of a less capable network to interval use devices. In some examples, the beam provided to the first group of devices may include beam shape 440, the beam provided to the second group of devices may include beam shape 450 and the coverage of the less capable network may include network coverage 490, as illustrated in FIGS. 4A and 4B.

As discussed in method 500, three or more coverage configurations may be employed such that one of the coverage configurations includes a narrow beam shape that may provide coverage to one or more continuous use devices. In general, any number of coverage configurations may be used in analogy to the illustrated configurations such that the following may be cycled through over time: any number of phases of coverage by a relatively wide beam of a more capable network type to subsets of all the devices and coverage by a less capable network to the remaining (or out of phase) devices, and a coverage configuration that may include a relatively narrow beam shape of the more capable network that may cover a continuous use device or devices and coverage by the less capable network to the remaining interval use devices. In some examples, the number of coverage configurations may be the same over time. In some examples, the number of coverage configurations may change over time. In some examples, some cycles may include the coverage configurations of FIGS. 1A and 1B and other cycles may include the coverage configurations of FIGS. 4A, 4B and 4C. A determination of which coverage configuration may be used during each cycle may be based on the number of devices in the area, the number of continuous use devices, the locations of the continuous use devices, or the like.

FIG. 6 illustrates an example computer program product 600, arranged in accordance with at least some embodiments of the present disclosure. Computer program product 600 may include machine readable non-transitory medium having stored therein a plurality of instructions that, when executed, cause the machine to provide device power management according to the processes and methods discussed herein. Computer program product 600 may include a signal bearing medium 602. Signal bearing medium 602 may include one or more machine-readable instructions 604, which, when executed by one or more processors, may operatively enable a computing device to provide the functionality described herein with respect to FIG. 2, FIG. 3, and/or FIG. 5 or any of the functionality discussed herein. In some examples, referring to the method of FIG. 2 and FIG. 5, a device controlling antenna 120 may undertake one or more of the operations shown in FIG. 2, and/or FIG. 5 in response to instructions 404 conveyed by medium 402. In some examples, referring to the method of FIG. 3, an interval use device such as any of those devices discussed herein may undertake one or more of the operations shown in FIG. 3 in response to instructions 404 conveyed by medium 402.

In some implementations, signal bearing medium 602 may encompass a computer-readable medium 605, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). In some examples, signal bearing medium 602 may encompass a machine readable non-transitory medium.

Figure 7:
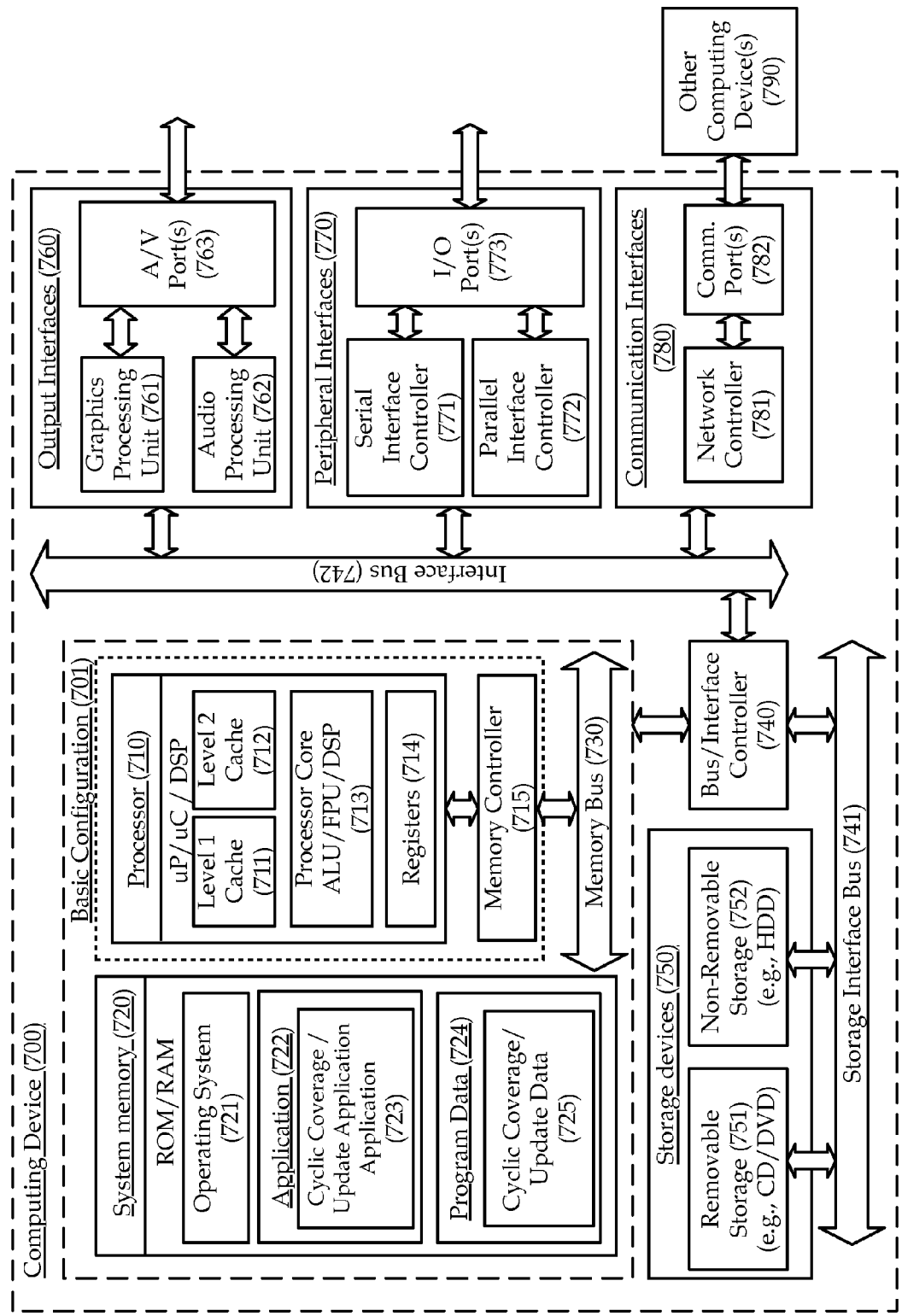
FIG. 7 is an illustration of a block diagram of an example computing device, all arranged in accordance with at least some embodiments of the present disclosure.

FIG. 7 is a block diagram illustrating an example computing device 700, arranged in accordance with at least some embodiments of the present disclosure. In various examples, computing device 700 may be configured to provide the network coverage operations or the device updating options discussed herein. In some examples, computing device 700 may be configured as a interval use device as discussed herein and may provide the functions and operations discussed with respect to FIG. 3. In some examples, computing device 700 may be configured as an antenna controller as discussed herein and may provide the functions and operations discussed with respect to FIG. 2 and/or FIG. 5. In one example basic configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include cyclic coverage or cyclic update application 723 that can be arranged to perform the functions, actions, and/or operations as described herein including the functional blocks, actions, and/or operations described herein. Program Data 724 may include cyclic coverage or cyclic update data 725 for use with application 723. In some example embodiments, application 722 may be arranged to operate with program data 724 on an operating system 721. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 780 may include a serial interface controller 781 or a parallel interface controller 782, which may be configured to communicate with external devices such as input devices (e.g., keyboard, mouse, pen, voice input device, touch input device, etc.) or other peripheral devices (e.g., printer, scanner, etc.) via one or more I/O ports 783. An example communication interface 780 includes a network controller 781, which may be arranged to facilitate communications with one or more other computing devices 783 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for providing network coverage for a group of devices in an area comprising:
    cycling over time through a coverage sequence that includes providing a first coverage configuration and providing a second coverage configuration, wherein:
        providing the first coverage configuration includes transmitting a first beam of a first network that is configured to provide coverage for the group of devices; and
        providing the second coverage configuration includes transmitting a second beam of the first network that is narrower than the first beam and configured to provide coverage to at least one continuous use device of the group of devices, the at least one continuous use device being actively involved in a substantially continuous service with the network, and providing coverage by a second network to a plurality of interval use devices of the group of devices.

2. The method of claim 1, wherein the providing the second coverage configuration comprises determining a direction of transmission for the second beam based at least in part on a location of the at least one continuous use device.

3. The method of claim 1, wherein the second beam of the first network is further configured to provide coverage to a second continuous use device of the group of devices.

4. The method of claim 1, wherein a subsequent iteration of providing the second coverage configuration includes transmitting the second beam of the first network configured to provide coverage to a second continuous use device, and wherein the at least one continuous use device has transitioned to being an interval use device.

5. The method of claim 1, wherein the first network and the second network are different network types.

6. The method of claim 5, wherein the first network and the second network comprise at least one of the following: the first network is a Third Generation Mobile (3G) network and the second network is an Enhanced Data Rates for Global Evolution (EDGE) network, the first network is a Fourth Generation Mobile (4G) network and the second network is an Enhanced Data Rates for Global Evolution (EDGE) network, the first network is a Long Term Evolution (LTE) network and the second network is an Enhanced Data Rates for Global Evolution (EDGE) network, the first network is an Evolution-Data Optimized (EV-DO) network and the second network is a Code Division Multiple Access (CDMA) network, the first network is a Fourth Generation Mobile (4G) network and the second network is a Third Generation Mobile (3G) network, the first network is a data network and the second network is a voice network, or the first network is a data network and the second network is a mixed voice and data network.

7. The method of claim 1, wherein the first network and the second network are the same network types, and wherein the at least one continuous use device is allowed access to the second beam based on an admission control parameter.

8. The method of claim 1, wherein the first coverage configuration is provided for a first time duration and the second coverage configuration is provided for a second time duration that is longer than the first time duration.

9. The method of claim 8, wherein in the first time duration is in the range of about 2 to 5 minutes and the second time duration is in the range of about 2 to 10 seconds.

10. The method of claim 1, wherein the at least one continuous use device is engaged in at least one of a voice call, a download, or a content streaming.

11. The method of claim 1, wherein the plurality of interval use devices defer and batch data updates during the second coverage configuration and receive the data updates during the first coverage configuration.

12. The method of claim 1, wherein the second beam is narrower than the first beam in at least one of a horizontal plane or a vertical plane.

13. The method of claim 1, wherein the first beam is about 12 degrees wide and the second beam is about 1 degree wide.

14. A method for providing network coverage for a group of devices in an area comprising:
    cycling over time through a coverage sequence that includes providing a first coverage configuration, providing a second coverage configuration, and providing a third coverage configuration, wherein:
        providing the first coverage configuration includes transmitting a first beam of a first network that is configured to provide coverage for a first set of the group of devices, and providing coverage by a second network to at least a second set of the group of devices;
        providing the second coverage configuration includes transmitting a second beam of the first network that is configured to provide coverage for the second set of the group of devices, and providing coverage by the second network to at least the first set of the group of devices; and
        providing the third coverage configuration includes transmitting a third beam of the first network that is narrower than the first beam and is configured to provide coverage to at least one continuous use device of the group of devices, the at least one continuous use device being actively involved in a substantially continuous service with the network, and providing coverage by the second network to at least a plurality of interval use devices of the group.

15. The method of claim 14, wherein the first network and the second network comprise at least one of the following: the first network is a Third Generation Mobile (3G) network and the second network is an Enhanced Data Rates for Global Evolution (EDGE) network, the first network is a Fourth Generation Mobile (4G) network and the second network is an Enhanced Data Rates for Global Evolution (EDGE) network, the first network is a Long Term Evolution (LTE) network and the second network is an Enhanced Data Rates for Global Evolution (EDGE) network, the first network is an Evolution-Data Optimized (EV-DO) network and the second network is a Code Division Multiple Access (CDMA) network, the first network is a Fourth Generation Mobile (4G) network and the second network is a Third Generation Mobile (3G) network, the first network is a data network and the second network is a voice network, or the first network is a data network and the second network is a mixed voice and data network.

16. The method of claim 14, wherein the third beam of the first network is further configured to provide coverage to a second continuous use device of the group of devices.

17. A machine readable non-transitory medium having stored therein instructions that, when executed, cause a device to provide a network coverage by:
cycling over time through a coverage sequence that includes providing a first coverage configuration and providing a second coverage configuration, wherein:
providing the first coverage configuration includes transmitting a first beam of a first network that is configured to provide coverage for the group of devices; and
providing the second coverage configuration includes transmitting a second beam of the first network that is narrower than the first beam and configured to provide coverage to at least one continuous use device of the group of devices, the at least one continuous use device being actively involved in a substantially continuous service with the network, and providing coverage by a second network to a plurality of interval use devices of the group of devices.

18. The machine readable non-transitory medium of claim 17, wherein the first network and the second network are the same network types, and wherein the at least one active device is allowed access to the second beam based on an admission control parameter.

19. The machine readable non-transitory medium of claim 17, wherein the first coverage configuration is provided for a first time duration and the second beam shape is provided for a second time duration that is shorter than the first time duration.

20. A device comprising:
a machine readable medium having stored therein instructions that, when executed, cause the device to provide network coverage by:
cycling over time through a coverage sequence that includes providing a first coverage configuration and providing a second coverage configuration, wherein:
providing the first coverage configuration includes transmitting a first beam of a first network that is configured to provide coverage for the group of devices; and
providing the second coverage configuration includes transmitting a second beam of the first network that is narrower than the first beam and configured to provide coverage to at least one continuous use device of the group of devices, the at least one continuous use device being actively involved in a substantially continuous service with the network, and providing coverage by a second network to a plurality of interval use devices of the group of devices;
a processor coupled to the machine readable medium to execute the instructions; and
an adaptive antenna configured to transmit the first beam and the second beam.

21. The device of claim 20, wherein the first network and the second network are the same network types, the at least one active device is allowed access to the second beam based on an admission control parameter, and the adaptive antenna is further configured to transmit a third beam of the second network.

22. The device of claim 20, further comprising:
a second antenna configured to provide a third beam of the second network.

23. A method for a device to receive data updates comprising:
cycling over time through an update sequence that includes:
deferring, during coverage by a first network, data updates for the device;
transmitting a data update request in response to coverage by a second network, wherein the second network is a more capable network than the first network; and
receiving, during the second coverage configuration, a data update.

24. The method of claim 23, wherein the device comprises at least one of a mobile phone, a smartphone, a laptop computer, a netbook device, a tablet device or a personal digital assistant.

25. The method of claim 23, wherein the update sequence further comprises:
batching the deferred data updates for the device.

26. The method of claim 23, wherein the data update includes at least one of an email update, an Really Simple Syndication (RSS) feed update, a social networking update, a software update, a map update, or a gaming update.

27. The method of claim 23, wherein the first network and the second network comprise at least one of the following: the first network is a Third Generation Mobile (3G) network and the second network is an Enhanced Data Rates for Global Evolution (EDGE) network, the first network is a Fourth Generation Mobile (4G) network and the second network is an Enhanced Data Rates for Global Evolution (EDGE) network, the first network is a Long Term Evolution (LTE) network and the second network is an Enhanced Data Rates for Global Evolution (EDGE) network, the first network is an Evolution-Data Optimized (EV-DO) network and the second network is a Code Division Multiple Access (CDMA) network, the first network is a Fourth Generation Mobile (4G) network and the second network is a Third Generation Mobile (3G) network, the first network is a data network and the second network is a voice network, or the first network is a data network and the second network is a mixed voice and data network.

* * * * *

UNITED STATES PATENT AND TRADEMARK OFFICE
CERTIFICATE OF CORRECTION

PATENT NO. : 8,554,196 B2  
APPLICATION NO. : 13/321792  
DATED : October 8, 2013  
INVENTOR(S) : Kruglick Page 1 of 1

It is certified that error appears in the above-identified patent and that said Letters Patent is hereby corrected as shown below:

In the Drawings:

In Fig. 7, Sheet 7 of 7, delete "uP/uC/DSP" and insert -- µP/µC/DSP --, therefor.

In Fig. 7, Sheet 7 of 7, in Box "(723)", in Lines 2-3, delete "Updated Application Application" and insert -- Update Application --, therefor.

In the Specification:

In Column 6, Line 7, delete "may be ρ," and insert -- may be p, --, therefor.

In Column 12, Line 28, delete "tower 120" and insert -- tower 125 --, therefor.

In Column 15, Line 5, delete "medium 605," and insert -- medium 606, --, therefor.

In Column 16, Line 34, delete "780 may include a serial interface controller 781" and insert -- 770 may include a serial interface controller 771 --, therefor.

In Column 16, Line 35, delete "controller 782," and insert -- controller 772, --, therefor.

In Column 16, Line 40, delete "ports 783." and insert -- ports 773. --, therefor.

In Column 16, Line 43, delete "devices 783" and insert -- devices 790 --, therefor.

In Column 17, Line 56, delete "and or" and insert -- and/or --, therefor.

In the Claims:

In Column 22, Line 40, in Claim 26, delete "an Really" and insert -- Really --, therefor.

Signed and Sealed this  
Twenty-seventh Day of May, 2014

Michelle K. Lee  
*Deputy Director of the United States Patent and Trademark Office*